(12) United States Patent
Likourezos et al.

(10) Patent No.: US 7,483,856 B2
(45) Date of Patent: Jan. 27, 2009

(54) SYSTEM AND METHOD FOR EFFECTING PAYMENT FOR AN ELECTRONIC AUCTION COMMERCE TRANSACTION

(75) Inventors: George Likourezos, Brooklyn, NY (US); Michael A. Scaturro, Garden City, NY (US)

(73) Assignee: XPRT Ventures, LLC, Greenwich, CT (US)

( * ) Notice: Subject to any disclaimer, the term of this patent is extended or adjusted under 35 U.S.C. 154(b) by 1434 days.

(21) Appl. No.: 09/764,618

(22) Filed: Jan. 17, 2001

(65) Prior Publication Data

US 2002/0095372 A1 Jul. 18, 2002

(51) Int. Cl.
*G06Q 40/00* (2006.01)

(52) U.S. Cl. .............................. 705/39; 705/38; 705/36; 705/35

(58) Field of Classification Search ................. 382/139; 705/35–44

See application file for complete search history.

(56) References Cited

U.S. PATENT DOCUMENTS

| | | | | |
|---|---|---|---|---|
| 4,876,648 | A | * 10/1989 | Lloyd | 705/38 |
| 5,689,649 | A | * 11/1997 | Altman et al. | 705/36 |
| 5,715,314 | A | 2/1998 | Payne et al. | |
| 5,794,219 | A | 8/1998 | Brown | |
| 5,845,265 | A | 12/1998 | Woolston | |
| 5,890,138 | A | 3/1999 | Godin et al. | |
| 5,946,668 | A | * 8/1999 | George | 705/38 |
| 5,956,700 | A | 9/1999 | Landry | |
| 5,960,411 | A | 9/1999 | Hartman et al. | |
| 6,021,397 | A | 2/2000 | Jones et al. | |

(Continued)

FOREIGN PATENT DOCUMENTS

JP 2002074235 A 3/2002

(Continued)

OTHER PUBLICATIONS

Aucxis Announces Publicly Traded Subsidiary e-Auction Australasia will roll out aucxis' e-business services to perishable e-markets in Australia and New Zealand PR Newswire. New York: Jan. 3, 2001. p. 1.*

(Continued)

*Primary Examiner*—Frantzy Poinvil
*Assistant Examiner*—Clement Graham
(74) *Attorney, Agent, or Firm*—George Likourezos; Michael A. Scaturro; Leo G. Lenna

(57) ABSTRACT

The invention provides a computerized electronic auction payment system and method for effecting a real-time payment for an item won in an electronic auction by setting up and maintaining electronic auction payment accounts for prospective bidders and sellers. The prospective bidders provide funds to their electronic auction payment accounts maintained by the computerized electronic auction payment system, prior to being deemed as winning bidders, via direct deposit, using a credit card, or sending a check, money order, or other financial document to an operator of the computerized electronic auction payment system. In one embodiment, a prospective bidder authorizes the computerized electronic auction payment system to effect a real-time payment to the seller upon the prospective bidder being deemed the winning bidder (i.e., immediately following the conclusion of the auction). That is, without the winning bidder having to access a payment page via an Internet connection to a particular web site.

57 Claims, 9 Drawing Sheets

U.S. PATENT DOCUMENTS

| | | | |
|---|---|---|---|
| 6,044,360 A | 3/2000 | Picciallo | |
| 6,085,176 A | 7/2000 | Woolston | |
| 6,138,106 A | 10/2000 | Walker et al. | |
| 6,138,107 A | 10/2000 | Elgamal | |
| 6,202,051 B1 | 3/2001 | Woolston | |
| 6,266,651 B1 | 7/2001 | Woolston | |
| 6,304,860 B1* | 10/2001 | Martin et al. | 705/43 |
| 6,321,211 B1 | 11/2001 | Dodd | |
| 6,466,917 B1 | 10/2002 | Goyal et al. | |
| 6,477,509 B1 | 11/2002 | Hammons et al. | |
| 6,629,081 B1 | 9/2003 | Cornelius et al. | |
| 6,629,082 B1* | 9/2003 | Hambrecht et al. | 705/37 |
| 6,760,470 B1* | 7/2004 | Bogosian et al. | 382/139 |
| 7,177,836 B1 | 2/2007 | German et al. | |
| 7,222,092 B2 | 5/2007 | Grove et al. | |
| 7,299,206 B2 | 11/2007 | Taylor et al. | |
| 7,340,429 B2 | 3/2008 | Maltzman | |
| 7,343,335 B1 | 3/2008 | Olliphant | |
| 2001/0009005 A1 | 7/2001 | Godin et al. | |
| 2001/0042785 A1 | 11/2001 | Walker et al. | |
| 2002/0002513 A1 | 1/2002 | Chiasson | |
| 2002/0016769 A1 | 2/2002 | Barbara et al. | |
| 2002/0026396 A1 | 2/2002 | Dent et al. | |
| 2002/0029339 A1 | 3/2002 | Rowe | |
| 2002/0032653 A1 | 3/2002 | Schutzer | |
| 2002/0077978 A1 | 6/2002 | O'Leary et al. | |
| 2002/0087461 A1* | 7/2002 | Ganesan et al. | 705/39 |
| 2002/0087469 A1 | 7/2002 | Ganesan et al. | |
| 2002/0128878 A1 | 9/2002 | Maritzen et al. | |
| 2003/0093326 A1 | 5/2003 | Poon et al. | |
| 2004/0117302 A1 | 6/2004 | Weichert et al. | |
| 2004/0128195 A1 | 7/2004 | Sorem | |
| 2004/0204990 A1 | 10/2004 | Lee et al. | |
| 2004/0204991 A1 | 10/2004 | Monahan et al. | |
| 2004/0225606 A1 | 11/2004 | Nguyen et al. | |
| 2004/0260615 A1 | 12/2004 | Phillips et al. | |
| 2005/0065881 A1 | 3/2005 | Li et al. | |
| 2005/0071244 A1 | 3/2005 | Phillips et al. | |
| 2005/0102242 A1 | 5/2005 | Omidyar | |
| 2005/0108104 A1 | 5/2005 | Woo | |
| 2005/0144071 A1 | 6/2005 | Monahan et al. | |
| 2005/0149394 A1 | 7/2005 | Postrel | |
| 2005/0228750 A1 | 10/2005 | Olliphant | |
| 2005/0256806 A1 | 11/2005 | Tien et al. | |
| 2006/0036541 A1 | 2/2006 | Schleicher | |
| 2006/0143109 A1 | 6/2006 | Goel | |
| 2006/0149665 A1 | 7/2006 | Weksler | |
| 2006/0229998 A1 | 10/2006 | Harrison | |
| 2006/0293994 A1 | 12/2006 | Stuart | |
| 2007/0011104 A1 | 1/2007 | Leger et al. | |
| 2007/0136177 A1 | 6/2007 | Reeth et al. | |
| 2007/0265961 A1 | 11/2007 | Shah et al. | |
| 2008/0015971 A1 | 1/2008 | Maltzman | |
| 2008/0097896 A1 | 4/2008 | Fisher et al. | |
| 2008/0104518 A1 | 5/2008 | Monahan et al. | |
| 2008/0133390 A1 | 6/2008 | Scipioni | |

FOREIGN PATENT DOCUMENTS

| | | |
|---|---|---|
| WO | WO 00/34899 A1 | 6/2000 |
| WO | WO 00/51047 A2 | 8/2000 |
| WO | WO 01/04816 A1 | 1/2001 |
| WO | WO 01/20524 A1 | 3/2001 |
| WO | WO 01/33447 A1 | 5/2001 |
| WO | WO 01/33449 A1 | 5/2001 |
| WO | WO 01/45002 A1 | 6/2001 |
| WO | WO/ 01/71452 A2 | 9/2001 |
| WO | WO 01/71452 A2 | 9/2001 |
| WO | WO/ 01/71452 A3 | 9/2001 |
| WO | WO 01/86550 A2 | 11/2001 |
| WO | WO 02/07059 A1 | 1/2002 |
| WO | WO 02/21384 A1 | 3/2002 |
| WO | WO 02/35427 A1 | 5/2002 |
| WO | WO 02/37233 A2 | 5/2002 |
| WO | WO 03/065151 A2 | 8/2003 |
| WO | WO 2004/099939 A3 | 11/2004 |
| WO | WO 2005/048152 A1 | 5/2005 |

OTHER PUBLICATIONS

*Welcome to the eBay payment service!*, Billpoint™, 6 pages, www.billpoint.com/. dated Dec. 29, 2000.

*ebay Online Payments by Billpoint™*, 6 pages, www.billpoint.com/help/opoverview.html, dated Dec. 29, 2000.

http://www.PayPal.com web site pages, printed on Jan. 29, 2001, copyright 2001 PayPal, 27 pages.

http://www.paydirect.yahoo.com web site pages, printed on Jul. 17, 2001, 15 pages.

PDG Auction User Guide, Version 1.0, copyright 1998, 1999, 2000, PDG Software, Inc., 137 pages.

http://www.bidfind.com web site pages, printed on Jul. 18, 2001, 8 pages.

http://www.pdgsoft.com web site pages, printed on Jul. 18, 2001, 5 pages.

eBay and Wells Fargo Launch Electronic Check as Alternative to Credit Card and Traditional Checks: eBay Online Payments by Billpoint Provides Fast, Economical Internet Payment Service, Jun. 6, 2000, Wells Fargo, http://www.wellsfargo.com/press/article, printed on Oct. 10, 2002.

Bidder Beware: Towards a Fraud-Free Marketplace—Best Practices for the Online Auction Industry, Selis et al, Jun. 2002, http://www.wa.gov/ago/consumer/auctions/home.htm, printed on Oct. 25, 2002.

Bidder Beware: Towards a Fraud-Free Marketplace—Best Practices for the Online Auction Industry, Selis et al, Apr. 2001.

Payment Methods For Consumer-To-Consumer Online Transactions, David E. Sorkin, 35 Akron L. Rev. 1 (2001).

ProQuest. Ask the Maven, Newsday. (Combined Editions). Long Island, N.Y., Dec. 6, 2000, p. C.07. http://proquest.umi.com. printed Oct. 24, 2007.

Request for Reconsideration of Petition to Make Special Pursuant to 37 C.F.R. Sec. 1.102 and accompanying documents filed in U.S. Appl. No. 09/946,616 and received by OIPE on Jun. 7, 2002-35 pgs.

Request for Reconsideration of Petition to Make Special Pursuant to 37 C.F.R. Sec. 1.102 and similar documents filed in U.S. Appl. No. 10/044,075 and received by OIPE on May 1, 2002, 49 pages.

Buyer Payment Tutorial, http://pages.ebay.com/checkout/buyer_1.html, printed on Jul. 24, 2008, 7 pages.

Seller Payment Tutorial, http://pages.ebay.com/checkout/seller_1.html, printed on Jul. 24, 2008, 6 pages.

Google Checkout, https://checkout.google.com, printed on Jul. 24, 2008, 16 pages.

http://blogs.zdnet.com, Donna Bogatin, "It's official: Google launches 'Checkout' with predatory pricing model aiming to 'increase advertising spending'," Jun. 29, 2006, 3 pages.

http://AuctionBytes.com/cab/abn/y06/m06/i29/s00, Ina Steiner, "eBay's Fears Confirmed: Google Launches Checkout Service," Jun. 29, 2006, 4 pages.

* cited by examiner

PLEASE REGISTER

FIRST NAME _____ M.I. ___ LAST NAME _____ DATE OF BIRTH _____

SOCIAL SECURITY NO. _____

MAILING ADDRESS _____ COUNTRY OF CITIZENSHIP _____

CITY _____ STATE ___ ZIP CODE _____ COUNTRY _____

USER-NAME _____ } 304

PASSWORD _____ } 306

NEXT ---> 308

PAYMENT PAGE

AUCTION ITEM NO. 42134698
ITEM DESCRIPTION: SILVER BOWL (CIRCA 1920)
SELLER USER-NAME: SILVERRADO
BUYER USER-NAME: ILOVE COLLECTING
FINAL AUCTION PRICE: US $115.00

502 → ENTER TOTAL FUNDS TO TRANSFER: _____
504 → INSURANCE (OPTIONAL): _____

INSURANCE PRICES ← 506

508

ENTER PASSWORD: _____ ← 510

NEXT --→ ← 512

SYSTEM AND METHOD FOR EFFECTING PAYMENT FOR AN ELECTRONIC AUCTION COMMERCE TRANSACTION

FIELD OF THE INVENTION

The present invention relates to a computerized electronic auction payment system and a method for effecting a real-time payment using the computerized electronic auction payment system for an item won on an electronic auction, where users access the computerized electronic auction payment system by remote terminals via an electronic network, such as the Internet.

BACKGROUND OF THE INVENTION

A conventional auction is a prior art process in which bids from bidders are received by an auctioneer for an item to be sold. The bidder whose bid is the highest at the termination of the auction (the "successful or winning bidder") becomes the purchaser of the item.

With the advent of electronic networks, such as the Internet, electronic auctions have become tremendously popular. Electronic auctions typically entail a seller of an item accessing an electronic auction web site, such as EBAY™ and YAHOO!™ Auctions, using a remote terminal and a web browser via the electronic network. The prospective seller then lists the item for sale with a short description describing the item which may include a scanned photograph of the item, provides a beginning selling price, and a date and time for the auction to end. Generally, the date and time for the auction to end must be at least seven to ten days from the present date and time; the present date and time is generally set as the date and time for the auction to begin by an auction management system, such as software and hardware modules, overseeing the electronic auction web site.

The seller can also provide, prior to initiating the commencement of the electronic auction, any additional costs the winning bidder will have to pay, such as shipping and handling fees and taxes, and any additional costs the winning bidder is recommended to pay, such as shipping insurance. Additional information which is provided by the seller or the electronic auction web site management system, prior to the commencement of the electronic auction, includes identification information corresponding to the seller, e.g., the seller's user-name, and the seller's location.

During the auction, a prospective bidder using a remote terminal accesses the electronic auction web site via the electronic network and views the item for sale. The prospective bidder can then submit a bid by typing a bid amount, which is greater than a displayed current selling price, and entering his user-name. The auction web site then informs the user or bidder whether he is or is not currently the highest bidder. If the bidder is not the highest bidder, the electronic auction web site informs the bidder of the current selling price and offers the bidder an opportunity to bid again.

The bidder may not be the highest bidder even though the bidder may have entered a bid amount greater than the displayed current selling price, because each bidder is allowed to enter a maximum bid amount, i.e., the most the bidder is willing to pay for the item. The electronic auction web site, however, typically displays an amount less than the maximum bid amount, which is sufficient to surpass a previous bid, as the displayed current selling price. Hence, a current bidder's bid amount may be greater than the displayed current selling price, but not greater than the previous bidder's maximum bid amount. Therefore, the current bidder will need to bid again if he desires to surpass the previous bidder's maximum bid amount and become the current high bidder.

The electronic auction web site also offers a prospective bidder the option of sending an e-mail to the seller via the electronic network in order to obtain additional information about the item offered for sale, prior to bidding for the item. The seller can then e-mail the prospective bidder with the additional information which may assist the prospective bidder in determining whether to bid or not to bid for the item. Further, if the seller realizes that the additional information can be helpful to other prospective bidders, the seller can append the description of the item with the additional information to allow anyone accessing the section of the electronic auction web site listing the item to read the additional information.

At the conclusion of the electronic auction, the electronic auction web site management system deems the bidder who has the highest bid as the winning bidder. To effect payment for the item, an e-mail is sent to the seller and the winning bidder informing them to contact each other to proceed with a payment transaction. Upon the seller notifying the winning bidder of where to send payment, e.g., a check or money order, the winning bidder sends payment equal to the highest bid plus any other costs, such as shipping and handling, shipping insurance, and taxes, as indicated by the seller. Soon after receiving the payment from the winning bidder, the seller ships the item to the winning bidder.

Another prior art method for effecting payment for the item won on the electronic auction entails clicking an icon on the electronic auction web site and accessing a payment web site (or a payment segment of the electronic auction web site). The payment web site typically lists the seller's user-name and the item won. While at the payment web site, the winning bidder enters credit card information and the amount to be charged to his credit card. Subsequently, a management system overseeing the payment web site charges the credit card for the entered amount to a company or entity affiliated with an operator or owner of the payment web site. Upon payment confirmation, an e-mail is sent to the seller instructing the seller to ship the item to the winning bidder. After two to three business days, the payment web site management system pays the seller by direct deposit an amount equal to the charged amount minus a commission and a transaction fee. The commission typically paid to the operator or owner of the electronic auction web site and the transaction fee is paid to the operator or owner of the payment web site.

A variation of this method is for the winning bidder to directly transfer his credit card information to the seller. The seller then charges the credit card information and waits for a payment confirmation prior to shipping the item to the winning bidder.

It is a drawback of the prior art methods for effecting payment for the item won on the electronic auction in that the winning bidder is apt to waiting prior to effecting payment, since the winning bidder will need to perform several tasks, such as, for example, draft a check made payable to the seller, and mail the check to the seller. The winning bidder is also apt to waiting when he is bidding on other items, since the winning bidder usually prefers to draft checks, obtain money orders, etc. and mail them to the various sellers at one time.

Another drawback is that the seller must wait at least two business days to several weeks before being paid. For example, in the first prior art method described above, the winning bidder must draft a check, obtain a money order, or some other payment document, and mail it to the seller. This two-step process of paying for the item won typically causes the winning bidder to wait several days before proceeding with payment. Hence, this prior art method causes a delay from the time an auction ended until the time the seller is paid.

With the second prior art method described above, the winning bidder must enter his credit card information every time he wins an item on the electronic auction. Besides being cumbersome, a percentage of the population does not own credit cards and a percentage of the population feels uneasy transferring their credit card information via the electronic network, especially to unknown sellers. Further, the winning bidder is apt to waiting until the start of a new credit card billing cycle before transferring his credit card information to pay for the item won on the electronic auction. Again, this prior art method causes a delay from the time the auction ended until the time the seller is paid.

Another drawback with regards to the prior art methods is that the operator of the electronic auction web site must wait several days to several weeks before being paid a commission by the seller. The operator generally gets paid its commission by charging the seller's credit card, usually after e-mailing the seller and asking for the seller's authorization. It is apparent that there exists a delay from the time the auction ended until the time the operator of the electronic auction web site is paid its commission.

Accordingly, there exists a need for effecting a real-time payment for an item won on an electronic auction which overcomes the drawbacks provided above. Further, there exists a need for allowing the winning bidder to effect payment for an item won on an electronic auction without having to type and transfer credit card information over an electronic network. Further still, there exists a need for allowing a winning bidder who does not own a credit card or feels uneasy transferring credit card information via the electronic network to effect payment for an item won on an electronic auction without having to mail a check, a money order, or other payment document to the seller. Finally, there exists a need for allowing an operator of an electronic auction web site to get paid its commission in real-time at the conclusion of an auction.

SUMMARY OF THE INVENTION

The present invention provides a computerized electronic auction payment system and method for effecting a real-time payment for an item won in an electronic auction using the computerized electronic auction payment system, where users access the computerized electronic auction payment system by remote terminals, such as a personal computer, PDA, cellular phone, etc., via an electronic network, such as the Internet. The computerized electronic auction payment system and method of the present invention overcomes the drawbacks of prior art methods and affords additional advantages.

According to an aspect of the present invention, the computerized electronic auction payment system and method effect a real-time payment for an item won in an electronic auction by setting up and maintaining electronic auction payment accounts for prospective bidders and sellers. The prospective bidders provide funds to their electronic auction payment accounts maintained by the computerized electronic auction payment system, prior to being deemed as winning bidders, via direct deposit, using a credit card, or sending a check, money order, or other financial document to an operator of the computerized electronic auction payment system. In one embodiment, upon being deemed as a winning bidder, the winning bidder accesses a payment page, enters the total amount of funds to be transferred to the seller, and authorizes the computerized electronic auction payment system to effect a real-time payment by debiting his, i.e., the winning bidder's, respective electronic auction payment account and crediting the electronic auction payment account of the seller, and/or another account specified by the seller.

In an alternate embodiment, the prospective bidder authorizes the computerized electronic auction payment system to effect a real-time payment to the seller upon the prospective bidder being deemed the winning bidder (i.e., immediately following the conclusion of the auction). That is, without the winning bidder having to access the payment page.

According to another aspect of the present invention, the computerized electronic auction payment system and method enable a winning bidder to effect payment for an item won on an electronic auction without having to type and transfer credit card information over an electronic network.

Further, according to another aspect of the present invention, the computerized electronic auction payment system and method enable a winning bidder who does not own a credit card or feels uneasy transferring credit card information via an electronic network to effect payment for an item won on an electronic auction without having to mail a check, a money order, or other payment document to the seller.

Further, according to another aspect of the present invention, the computerized electronic auction payment system and method enable an operator of an electronic auction web site to get paid its commission in real-time at the conclusion of an auction or upon authorization by a winning bidder.

Further still, according to another aspect of the present invention, the computerized electronic auction payment system and method provide insurance to a winning bidder, in the case where the item won is never shipped to the winning bidder or the item turns out to be non-genuine and/or damaged without the fault of the courier, i.e., shipping insurance will not cover the damaged item. Accordingly, an operator of the computerized electronic auction payment system and method is deemed as being an insurance agent.

Further yet, according to another aspect of the present invention, the computerized electronic auction payment system and method invest funds stored within electronic auction payment accounts set up by users of an electronic auction web site. Accordingly, an operator of the computerized electronic auction payment system and method is deemed as being an investment broker.

Yet still, according to another aspect of the present invention, the computerized electronic auction payment system and method are capable of cashing checks drafted against electronic auction payment accounts set up by users of an electronic auction web site. Accordingly, an operator of the computerized electronic auction payment system and method is deemed as being a banker.

Also, according to another aspect of the present invention, the computerized electronic auction payment system and method make loans to users of an electronic auction web site who have set up electronic auction payment accounts. Accordingly, an operator of the computerized electronic auction payment system and method is deemed as being a loan officer.

Finally, according to another aspect of the present invention, the computerized electronic auction payment system and method provide incentives to users of an electronic auction web site for setting up and maintaining electronic auction payment accounts for buying and selling items using the electronic auction web site. Accordingly, an operator of the computerized electronic auction payment system and method is deemed as being a promoter.

In particular, the present invention provides a payment system for effecting payment to a seller of an item offered for an electronic auction sale and won by a winning bidder at the conclusion of the electronic auction sale. The system includes a database containing a plurality of electronic auction payment accounts, where the plurality of electronic auction payment accounts are configured for storing funds therein and capable of being configured for automatically having funds transferred thereto from various sources, and where one of the plurality of electronic auction payment accounts corresponds to the winning bidder and one of the plurality of electronic auction payment accounts corresponds to the seller; and a web server computer including application software for effecting payment by accessing the database and debiting an electronic auction payment account corresponding to the winning bidder and crediting at least one account corresponding to the seller without any intervention by the winning bidder following the conclusion of the electronic auction. The steps of debiting the electronic auction payment account corresponding to the winning bidder and crediting the at least one account corresponding to the seller occur in real-time.

The present invention also provides a method for effecting payment for an item offered for an electronic auction sale by a seller and won by a winning bidder at the conclusion of the electronic auction sale where computer terminals of potential purchasers are used to access an electronic auction web site maintained by an auction server computer. The method includes the steps of: debiting an electronic auction payment account corresponding to the winning bidder, where the electronic auction payment account is configured for storing funds therein and capable of being configured for automatically having funds transferred thereto from at least one source corresponding to the winning bidder of the item; and crediting at least one account corresponding to the seller to effect payment for the item won by the winning bidder. The steps of debiting the electronic auction payment account corresponding to the winning bidder and crediting the at least one account corresponding to the seller occur in real-time.

BRIEF DESCRIPTION OF THE DRAWINGS

The foregoing and other aspects and advantages will be better understood from the following detailed description of preferred embodiments of the invention with reference to the drawings, in which:

FIG. 3 illustrates a print of a registration page that the computerized electronic auction payment system provides to a user for entering registration information;

FIG. 5 illustrates a print of the payment page that the computerized electronic auction payment system provides to the winning bidder at the conclusion of an electronic auction;

DETAILED DESCRIPTION OF THE PREFERRED EMBODIMENTS

Figure 1:
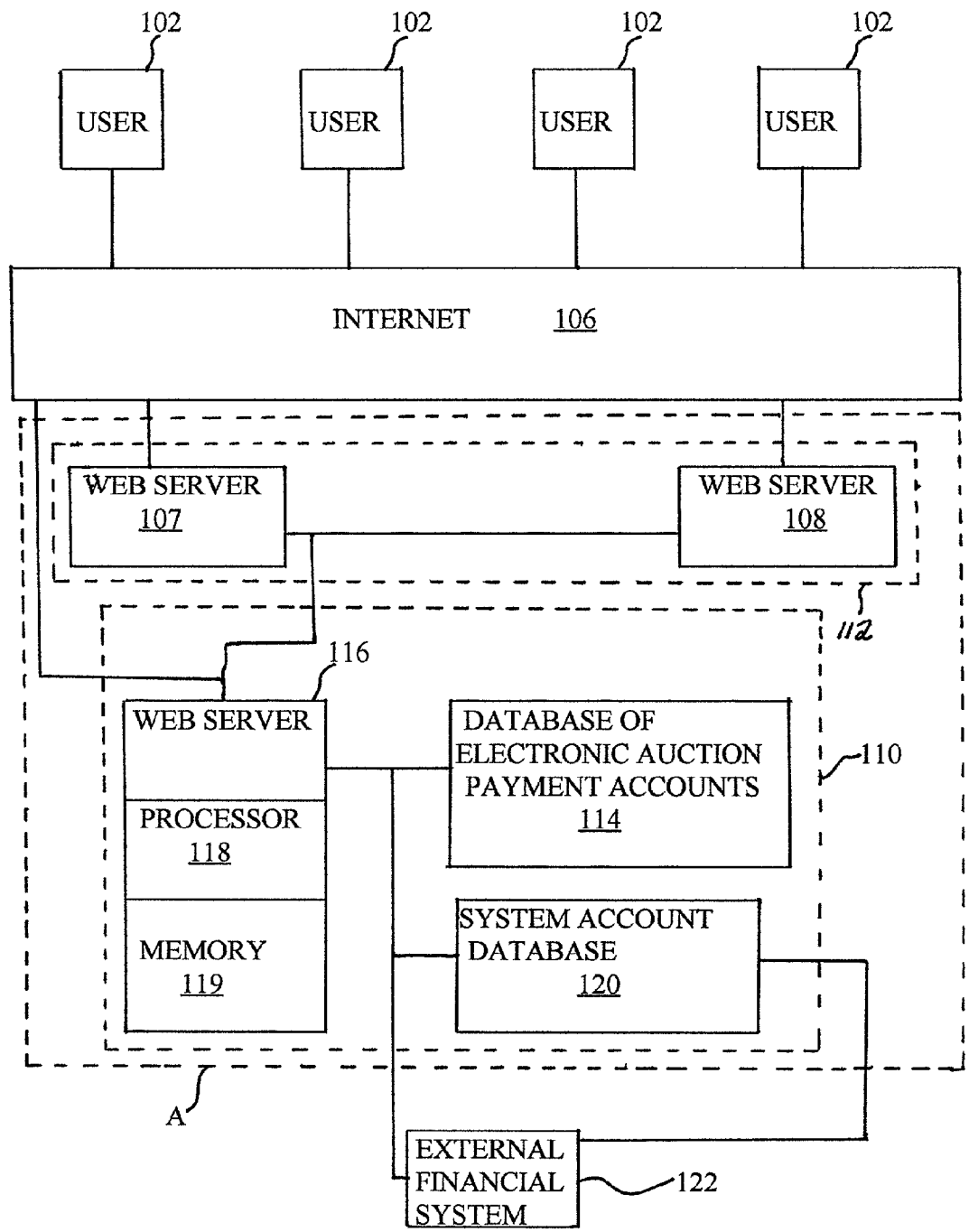
FIG. 1 is an overview of a network computing environment including the computerized electronic auction payment system according to the invention.

FIG. 1 is an overview of a network computing environment 100 which includes the computerized electronic auction payment system according to the invention designated generally by reference numeral 110. The network computing environment 100 is designed to allow a host of users shown as 102 access to an electronic auction web site via a network, such as the Internet 106. Each of the users 102 has a computer terminal with the appropriate software, e.g., a web browser, for accessing the Internet 106. The users 102 are unknown to web server computers 107 and 108 of an electronic auction system 112, such as EBAY™. The web server computers 107 and 108 include custom written application software to maintain the electronic auction web site and allow each user 102 to browse the electronic auction web site and bid for items and/or sell items as known in the art.

The web server computers 107 and 108 of system 112 also allow each user to access the computerized electronic auction payment system 110 for effecting a real-time payment at the conclusion of an electronic auction. The web server computers 107 and 108 also provide data to the computerized electronic auction payment system 110, such as the names of the winning bidder and seller at the conclusion of the electronic auction.

The computerized electronic auction payment system 110 includes a database of electronic auction payment accounts 114 and a web server computer 116 having a processor 118 capable of executing a set of programmable instructions stored within a memory 119. The set of programmable instructions are custom written application software to enable the computerized electronic auction payment system 110 to perform various functions and methods described herein, such as maintaining the database of electronic auction payment accounts 114, and executing user-specified instructions, such as to loan funds to the user 102 if the user 102 has insufficient funds in his account to effect payment. The set of programmable instructions also enable the computerized electronic auction payment system 110 to perform the inventive method of enabling a winning bidder to effect the real-time payment of an item won on the electronic auction web site as described below with reference to FIGS. 2A-7.

As shown by the large dotted box marked "A" in FIG. 1, the computerized electronic auction payment system 110 is located locally with the web server computers 107 and 108 and is connected to the Internet 106 directly and via the web server computers 107 and 108. The computerized electronic auction payment system 110 maintains a payment segment of the electronic auction web site and also enables a user 102 to access the payment segment.

It is contemplated that the computerized electronic auction payment system 110 can also be located remotely from the web server computers 107 and 108 for maintaining the payment segment or an auction payment web site independent from the electronic auction web site and for enabling the user 102 to access the payment segment or the auction payment web site. The payment segment of the electronic auction web site or the independent auction payment web site are accessed by conventional methods, e.g., by the user 102 clicking an icon on the electronic auction web site, by the user 102 clicking a hyperlink on an e-mail, and by the user 102 typing the appropriate URL in the user's web browser.

The web server computers 107 and 108 share the responsibility for servicing the users of the electronic auction web site. The web server computer 116 has the responsibility for registering users of the system 110 and servicing the registered users as described below.

The web server computers 107 and 108 are identical and can be duplicated as additional load on the electronic auction system 112 occurs. The web server computer 116 can also be duplicated as additional load on the computerized electronic auction payment system 110 occurs. The duplication arrangement provides for immediate expandability of the electronic auction system 112 and the computerized electronic auction payment system 110 by merely adding additional web server computers as necessary. It is contemplated that network computing environment 100 is provided with one type of computer server for performing the functions of the web server computers 107 and 108 and the web server computer 116.

Each electronic auction payment account is configured for storing funds (similar to a bank account) which can be used to effect payment, and not information relating to sources which can be used to initiate payment, such as a credit card information. Further, each electronic auction payment account is configured for the system 110 to loan funds to, in case there are insufficient funds therein, to effect payment, as described below.

Figure 2A:
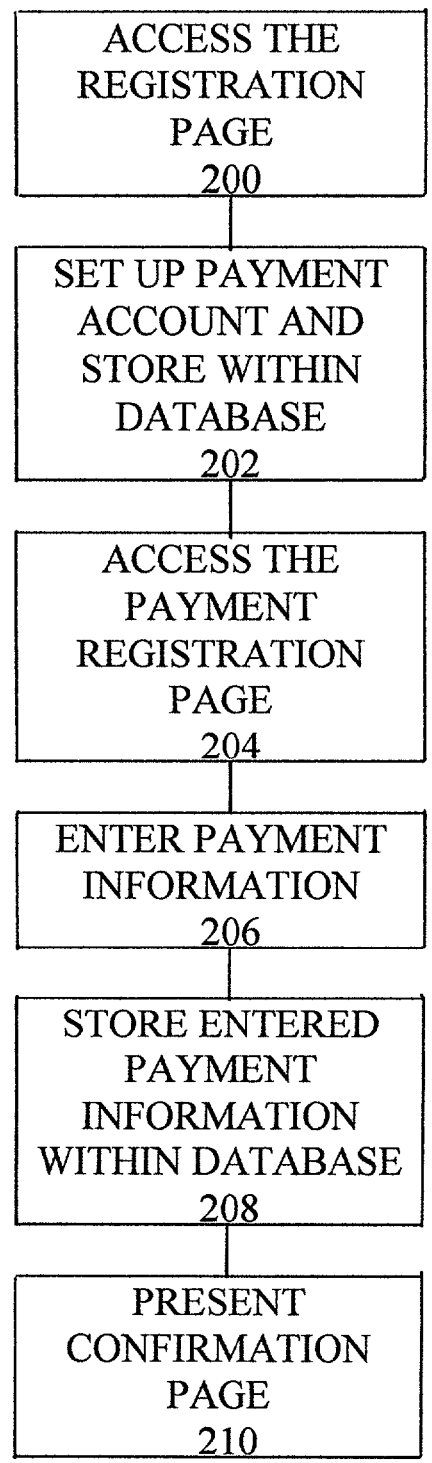
FIG. 2A is a flow chart illustrating logic processing steps for setting up electronic auction payment accounts using the computerized electronic auction payment system according to the invention.

With reference to FIG. 2A there is shown a flow chart illustrating logic processing steps for setting up an electronic auction payment account for effecting the real-time payment using the electronic auction web site's payment segment maintained by the computerized electronic auction payment system 110. Step 200 provides for the user 102 of the electronic auction web site, such as EBAY™ and YAHOO!™ Auctions, to access a registration page 300 (see FIG. 3) of the payment segment to register and set up the electronic auction payment account.

With reference to FIG. 3, the registration page 300 includes several fields 302 for the user 102 to enter identifying information, such as first name, last name, date of birth, citizenship, mailing address, and social security number. It is contemplated that fields can also be provided for registering corporations, organization, legal partnerships, etc. Such fields could require the user 102 to enter a corporate name and a tax identification number.

The registration page 300 also includes a field 304 for the user 102 to enter a user-name. The user-name could be identical to a user-name which the user 102 has been previously assigned by the electronic auction system 112. The registration page 300 further includes a field 306 for the user 102 to enter a password. The password could be identical to a password which the user 102 has been previously assigned by the electronic auction system 112.

Upon entering the appropriate information on the registration page 300, the user 102 then clicks on a "NEXT" soft button 308. Upon clicking the "NEXT" soft button 308, the computerized electronic auction payment system 110 sets up the electronic auction payment account having the entered information and stores the electronic auction payment account within the database of electronic auction payment accounts 114 (step 202). The process then proceeds to step 204 where a payment registration page 400 (see FIG. 4A) of the payment segment is accessed.

It is contemplated that prior to proceeding to step 204, the system 110 forwards the entered information to a credit checking system to verify the credit rating of the user 102.

Figure 4A:
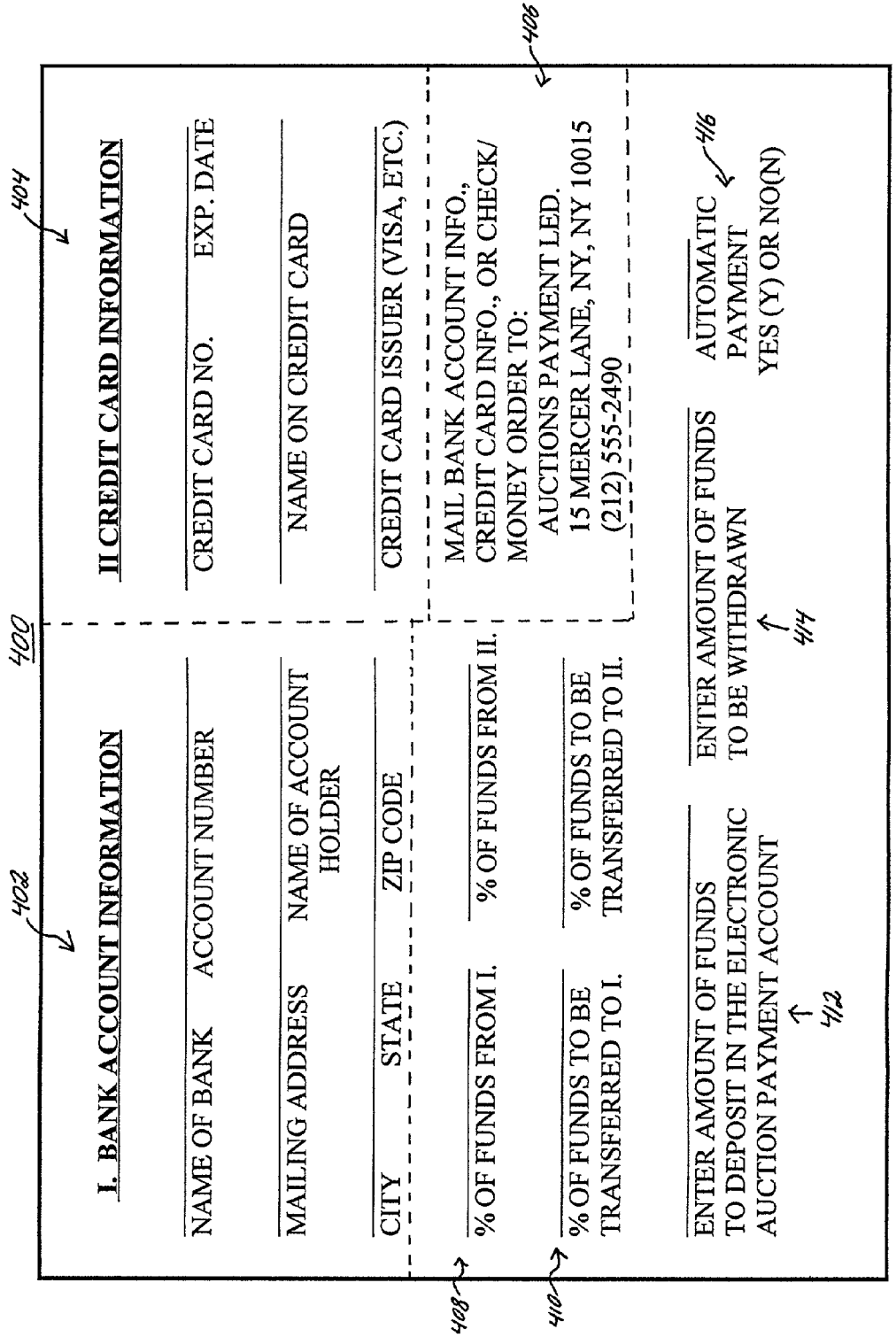
FIGS. 4A-4B illustrates prints of a payment registration page that the computerized electronic auction payment system provides to a user for entering payment information.

With reference to FIG. 4A, the payment registration page 400 allows each user 102 to enter payment information (step 206). The payment registration page 400 includes several fields 402 for entering bank account information corresponding to a bank account the user 102 wants the computerized electronic auction payment system 110 to transfer funds from and to his electronic auction payment account.

The payment registration page 400 also includes several fields 404 for entering credit card information, in order for the computerized electronic auction payment system 110 to charge the user's credit card and deposit funds to the user's electronic auction payment account, prior to the user 102 being deemed a winning bidder for an item won on the electronic auction web site. The credit card information entered within fields 404 are also used by the computerized electronic auction payment system 110 to credit the user's credit card where the user 102 is the seller as described below. It is contemplated that the payment registration page 400 includes additional fields for entering other types of sources, such as other credit cards, other bank accounts, investment brokerage and corporate accounts, to be used for transferring funds to and from the user's electronic auction payment account.

The payment registration page 400 also provides an address 406 for the user 102 to mail his payment information (e.g., bank account information, and credit card information) or a check/money order payable to an operator of the computerized electronic auction payment system 110, if the user 102 feels uneasy transferring his bank account and/or credit card information over the Internet 106. A phone number is also listed for the user 102 to be able to call a representative of the system 110 to provide payment information.

The payment registration page 400 of the payment segment further includes allocation fields 408 for the user 102 to indicate what percentage of funds deposited to his electronic auction payment account should be derived from charging his credit card and what percentage of funds deposited to his electronic auction payment account should be derived by transferring funds from his bank account. If only a single source is entered in payment registration page 400, then 100% of funds deposited to the user's electronic auction payment account are derived from that source, and the user 102 does not need to enter any percentages in allocation fields 408.

The payment registration page 400 also includes allocation fields 410 for the user 102 to indicate what percentage of funds transferred to his electronic auction payment account from other electronic auction payment accounts should subsequently be credited to his credit card and what percentage of funds transferred to his electronic auction payment account should subsequently be transferred by direct deposit to his bank account. If the percentages entered in each of the allocation fields 410 total less than 100%, then a percentage of the funds transferred to the user's electronic auction payment account from other electronic auction payment accounts are retained within the user's electronic auction payment account. Accordingly, the total percentages entered plus the percentage of funds retained within the user's electronic auction payment account equals 100%.

It is contemplated that the system 110 automatically transfers the percentage of funds allocated to user-specified accounts without first transferring these funds to the user's electronic auction payment account.

Since each user 102 of the electronic auction system 112 can use the system 112 to buy and sell items, it is preferred that each user 102 provide allocation percentages in fields 408 and 410. The fields 408 and 410 can be expanded for entering additional percentages relating to other accounts, such as investment brokerage and corporate accounts, which could be used for depositing and withdrawing funds to and from the electronic auction payment accounts.

The percentages entered in allocation fields 408 and 410, like other information entered within the payment segment of the electronic auction web site, can be changed and/or reviewed by the user 102 accessing his electronic auction payment account stored within the database of electronic auction payment accounts 114. The user 102 can access his electronic auction payment account by clicking a "MY PAYMENT ACCOUNT" icon while in the electronic auction web site to access a sign-in or log-in page for entering one's user-name and password, and clicking a "LOG-IN" icon.

The payment registration page 400 also includes a deposit field 412 for the user 102 to enter the amount of funds he wants to deposit into his electronic auction payment account from the various sources entered in fields 402 and 404. A withdrawal field 414 is also provided for the user 102 to enter the amount of funds he wants to withdraw from his electronic auction payment account and transfer to the various sources entered in fields 402 and 404.

An automatic payment field 416 is further provided for the user 102 to authorize the computerized electronic auction payment system 110 to debit the user's electronic auction payment account in real-time every time the user 102 is deemed a winning bidder. If the user 102 checks this field, then, at the conclusion of an electronic auction, if the user 102 is deemed the winning bidder, then the system 110 in real-time debits the user's electronic auction payment account and credits an electronic auction payment account corresponding to the seller, and/or other user-specified accounts corresponding to the seller as described above with reference to fields 402 and 404. The computerized electronic auction payment system 110 is provided with the names and identification information of the winning bidder and seller by the electronic auction system 112.

If the user 102, i.e., the winning bidder, has no funds in his respective electronic auction payment account, the computerized electronic auction payment system 110 loans system funds to the user 102 to effect the real-time payment. The system 110 loans system funds to the user 102, only if the user 102 has authorized the system 110 to loan system funds as described below. Preferably, the system 110 stores system funds in a system account maintained by a system account database 120, as shown by FIG. 1. The system account database 120 is accessible by the web server 116 for transferring and loaning system funds stored in the system account to the user's electronic auction payment account.

The system account database 120 is also accessible by an external financial system 122, such as a financial institution's local area network, for transferring funds to and from the system account maintained by the system account database 120, upon authorization by the web server 116. For example, the web server 116 can authorize the external financial system to wire funds in the amount of US$100,000 to the system account. These funds can then be used as system funds for loaning to users 102 of the system 110 and for other purposes.

The funds debited from the winning bidder's electronic auction payment account and credited to the seller's electronic auction payment account in real-time by the computerized electronic auction payment system 110 are preferably equal to the final auction price plus any shipping and handling fees, and taxes. It is contemplated that the computerized electronic auction payment system 110 is provided with the total amount of the shipping and handling fees from the electronic auction system 112. The system 112 stores these fees from the moment they were inputted by the seller at the time the seller listed the item on the electronic auction web site.

It is further contemplated that the computerized electronic auction payment system 110 debits the winning bidder's electronic auction payment account and credits the seller's electronic auction payment account to cover for taxes when the winning bidder and seller are from the same state or locality. This is determined by checking the state or locality corresponding to the winning bidder and the seller as stored within the database of electronic auction payment accounts 114. If the states or localities match, then the computerized electronic auction payment system 110 accordingly debits the winning bidder's electronic auction payment account to cover for taxes corresponding to that state or locality. It is, however, understood that the system 110 can be programmed to debit the winning bidder's electronic auction payment account to cover for taxes (equal to a pre-programmed percentage corresponding to the state or locality and credit the seller's payment account) even when the states or localities do not match, and/or to only debit to cover for taxes when the seller has indicated to the system 110 during the registration process or afterwards that he is a merchant, or other entity obligated by law to charge and pay taxes.

The computerized electronic auction payment system 110 further withholds a predetermined percentage of the funds obtained by debiting the winning bidder's electronic auction payment account while effecting the real-time payment when the automatic payment field 416 is checked. These funds are withheld by the system 110 to pay the commission fees of the operator of the system 110 and/or the operator of the electronic auction system 112. The withheld funds are preferably stored within the system account maintained by the system account database 120. The remaining or non-withheld funds are then credited to the electronic auction payment account of the seller, and/or other seller-specified accounts as described above with reference to fields 402 and 404.

Additionally, the computerized electronic auction payment system 110 debits the winning bidder's electronic auction payment account for purchasing insurance and/or to cover personal guarantee fees, if the winning bidder has accordingly indicated as described below. These funds are stored within the system account maintained by the system account database 120 to cover personal guarantee fees, or are transferred to the external financial system 122 to purchase insurance.

At the conclusion of the real-time payment, an e-mail is transmitted to the winning bidder and the seller confirming the transaction. The e-mail also indicates the total amount of funds debited, withheld and transferred, the mailing address of the winning bidder, the auction item, and the final auction price. The mailing address of the winning bidder is preferably obtained from the database of electronic auction payment accounts 114. The auction item and the final auction price are obtained or transmitted from the electronic auction system 112. The e-mail can further include a hyperlink for linking to a web site where the winning bidder and seller can leave comments regarding their payment transaction. A hyperlink can also be included for viewing and/or printing a bill of sale or receipt.

It is contemplated that the automatic payment feature is overridden if the winning bidder does not have enough funds in his electronic auction payment account and has not indicated to the computerized electronic auction payment system 110 to use system funds as described below. If this is the case, the system 110 informs the winning bidder by e-mail, by sending a page, facsimile, etc. of the fact that the winning bidder does not have enough funds within his electronic auction payment account to effect a real-time payment of the item won.

The winning bidder can then transfer funds into his electronic auction payment account and then access the payment page 500 as described below with reference to FIG. 5; authorize the system 110 to use system funds and then access the payment page 500 as described below; or mail a check, money order, etc. to the seller.

Figure 4B:
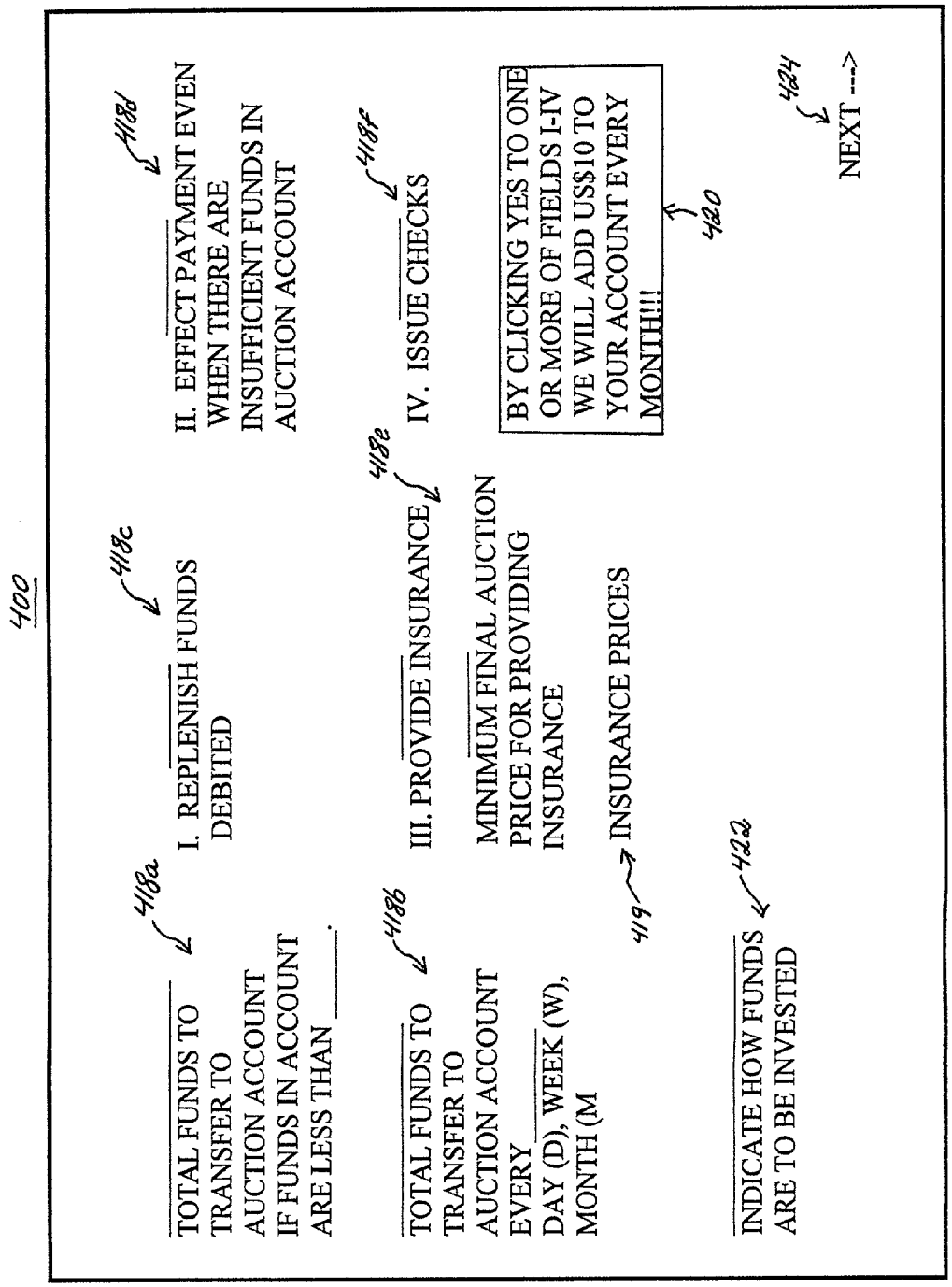

With reference to FIG. 4B, the payment registration page 400, or a sub-page thereof, further includes option fields 418a-f. Option field 418a permits the user 102 to specify an amount of funds to be transferred by the computerized electronic auction payment system 110 from sources specified in fields 402 and 404 to the user's electronic auction payment account, if the total amount of funds within the user's electronic auction payment account is less than a user-specified amount.

Option field 418b permits the user 102 to indicate an amount of funds to be transferred by the computerized electronic auction payment system 110 from sources specified in fields 402 and 404 to the user's electronic auction payment account on a user-specified periodic basis, e.g., daily, weekly, or monthly.

Option fields 418c-f are yes/no option fields. If the field is clicked, then the user 102 has indicated "yes"; if the field is not clicked, then the user 102 has indicated "no". Option field 418c permits the user 102 to indicate whether the computerized electronic auction payment system 110 should replenish, from sources specified in fields 402 and 404, any funds debited for transferring funds to other electronic auction payment accounts, e.g., upon effecting a payment after the conclusion of an auction. Option field 418d permits the user 102 to indicate whether the computerized electronic auction payment system 110 should use system funds, as stored within the system account, to effect payment for items won by the user 102, if the user's electronic auction payment account does not have sufficient funds to effect payment for the item won.

It is contemplated that the computerized electronic auction payment system 110 charges the user 102 interest for using system funds to effect payment. The interest charged is stored within the user's electronic auction payment account in order to allow the user 102 to view the outstanding interest charges by accessing his account. The total interest charged to all the users is preferably stored in the system account database 120 to allow the system 110 to easily determine the amount of interest due to the operator of the system 110. It is further contemplated that the computerized electronic auction payment system 110 automatically, or on a periodic basis, withdraws funds which are transferred to the user's electronic auction payment account and transfers these funds to the system account database 120, if the system 110 has used system funds to effect payment for the user 102 and the funds are currently outstanding, i.e., not paid.

It is further contemplated that the computerized electronic auction payment system "locks out" the user 102 from using the electronic auction web site, if the user 102 owes money greater than a predetermined amount to the system 110 and the user 102 has not paid a predetermined percentage of the money owed for a predetermined period of time. For example, the user 102 gets "locked out" if he owes the system 110 US$400 and has not paid 10% or US$40 to the system 110 during the last four weeks.

Option field 418e permits the user 102 to indicate whether the computerized electronic auction payment system 110 should effect insurance coverage for items won by the user 102. This field also permits the user 102 to indicate a minimum final auction price for effecting insurance coverage. For example, the user 102 can indicate that the system 110 should effect insurance coverage only when the final auction price is greater than or equal to US$500. An icon 419 is displayed which the user can click to view a listing of the insurance charges for a range of final auction prices.

If the user 102 indicates in option field 418e that the system 110 should effect insurance coverage for items won where the final auction price is greater than or equal to the minimum final auction price, then in every such instance, the system 110 also withdraws from (or, in case there are insufficient funds in the user's electronic auction payment account and the user 102 has indicated "yes" in option field 418d, loans to) the user's electronic auction payment account an amount equal to the insurance charge for the item won, if the final auction price is greater than or equal to the user-specified minimum final auction price. The system 110 stores these funds in the system account within the system account database 120 and then uses a portion of these funds, as directed by the web server 116, to purchase insurance for the item won by the user 102 from the external financial system 122 which may be an independent or affiliated insurance company or broker. The system 110 retains the other portion of the funds as an insurance purchase service fee. The retained portion can be stored within the system account, or preferably transferred to an interest-bearing account corresponding to the operator of the system 110. The interest-bearing account can be maintained by the external financial system 122. If the item turns out to be non-genuine and/or damaged, then the user 102 who bought insurance on the item can make a claim, to recover the funds transferred to the seller.

It is also contemplated that field 418e indicates to the user 102 that by indicating "yes", then any items won having a final auction price greater than or equal to the minimum final auction price are personally guaranteed by the operator of the computerized electronic auction payment system 110 for a predetermined guarantee fee. Accordingly, the operator of the computerized electronic auction payment system 110 personally guarantees any auction items won by the user 102 which have a final auction price which is greater than or equal to the user-specified minimum final auction price. Hence, the system 110 debits the winning bidder's electronic auction payment account to cover for personal guarantee fees and transfers the debited funds to the system account maintained by the system account database 120.

Option field 418f permits the user 102 to indicate whether the computerized electronic auction payment system 110 should issue and mail checks to the user 102. The user 102 can then use the issued checks to draft checks against his respective electronic auction payment account. The computerized electronic auction payment system 110 or an independent accounting system, e.g., the external financial system 122, keeps track of checks drafted against electronic auction payment accounts and instructs the system 110 to deduct funds from the appropriate accounts.

The payment registration page 400 also offers the user 102 incentives for providing information in option fields 418a and 418b and for indicating "yes" to one or more of option fields 418c-f. For example, as indicated by icon 420, the user 102 can be offered the incentive of the system 110 periodically adding a predetermined amount of funds to the user's electronic auction payment account if the user 102 indicates "yes" in option fields 418c-f. The user 102 can also be offered the incentive of the computerized electronic auction payment system 110 paying any shipping and handling charges for items won by the user 102 on the electronic auction web site.

The user 102 can also be offered incentives based on the amount of funds periodically transferred to his electronic auction payment account as indicated in option field 418b.

For example, if the user 102 transfers less than or equal to US$50 to his electronic auction payment account every week, then he has a 20% chance of winning a weekly sweepstakes drawing for a prize as conducted by the electronic auction payment system 110. If the user 102 transfers less than or equal to US$100 to his electronic auction payment account every week, then he has a 30% chance of winning the weekly sweepstakes drawing as conducted by the electronic auction payment system 110, and so on. A similar incentive can also be offered to the user 102 based on an average amount of funds used by the user 102 to buy auction items during a predetermined period, e.g., in a given month.

It is contemplated that these and other incentives are also indicated on the electronic auction web site where unregistered and registered users can view the incentives. For example, one incentive which could be offered by the electronic auction payment system 110 and indicated on the electronic auction web site is that all registered users of the system 110 are automatically entered in periodic sweepstakes where they have the opportunity to win various prizes, such as US$1,000.

Investment fields 422 are also provided by the payment registration page 400 of the payment segment for the user 102 to indicate how he wants his funds within his electronic auction payment account invested, e.g., a money market fund, a mutual fund account, etc. The funds can be invested by transferring the funds, upon instructions from the web server 116, to the external financial system 122, which could be, for example, an investment brokerage firm's system. If none of the investment fields 422 are selected by the user 102, the computerized electronic auction payment system 110 does not invest the user's funds.

The computerized electronic auction payment system 110 periodically adds funds to the user's electronic auction payment account reflecting any interest accrued by investing the user's funds. The computerized electronic auction payment system 110 retains a portion of the interest accrued by investing the user's funds as an investment service fee, prior to adding funds to the user's electronic auction payment account. The retained interest is stored within the system account, or preferably, transferred to an interest-bearing account corresponding to the operator of the system 110 and maintained by the external financial system 122. It is contemplated to provide incentives to the user 102 for authorizing the computerized electronic auction payment system to invest the user's funds.

Upon entering the appropriate information on the payment registration page 400, the user 102 then clicks on a "NEXT" soft button 424. Upon clicking the "NEXT" soft button 424, the computerized electronic auction payment system 110 appends the respective electronic auction payment account with the information entered in payment registration page 400 and stores the appended electronic auction payment account within the database of electronic auction payment accounts 114 (step 208 of FIG. 2A).

At step 210, a confirmation message page (not shown) is then presented to the user 102 indicating that his electronic auction payment account has been appropriately set up or changed (in case the user 102 accessed a previously set up electronic auction payment account and changed the information provided therein). The confirmation message page also indicates if any transactions are set to occur or have occurred based upon the information entered in the payment registration page 400. For example, a message can indicate that US$325 was withdrawn from the user's electronic auction payment account and transferred to the user's bank account as specified in field 402. Another message can indicate that US$325 was withdrawn from the user's bank account as specified in field 402 and transferred to the user's electronic auction payment account.

It is contemplated that a message is also presented to the user 102 asking for a confirmation from the user 102 prior to the computerized electronic auction payment system 110 proceeding with a specified transaction, such as "By clicking the YES button, US$325 will be transferred to Republic Bank Account No. 4356123. By clicking the CANCEL button, the transaction will be canceled."

Figure 2B:
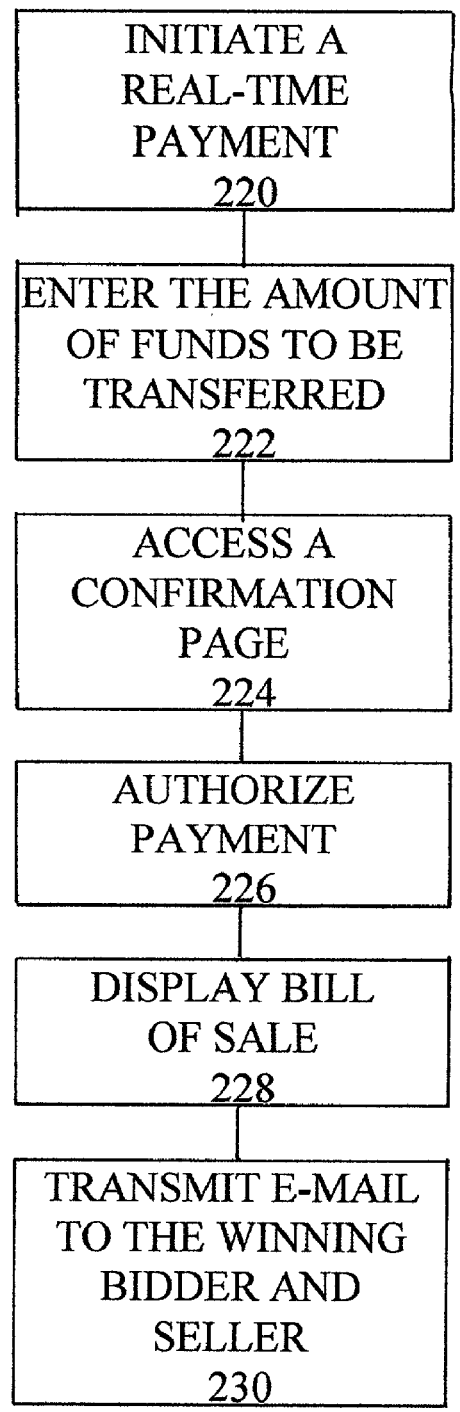
FIG. 2B is a flow chart illustrating logic processing steps for effecting a real-time payment using the computerized electronic auction payment system where the winning bidder accesses a payment page according to the invention.

A description will now be provided with reference to FIG. 2B for effecting a real-time payment using the computerized electronic auction payment system 110 at the conclusion of an electronic auction provided by the electronic auction system 112. The flow chart of FIG. 2B illustrates a real-time payment as initiated by the winning bidder by accessing a payment page of the payment segment of the electronic auction web site or an independent auction payment web site. That is, if the user 102 has not indicated "yes" in automatic payment field 416. As described above, a real-time payment can also be performed in real-time by the computerized electronic auction payment system 110 if the winning bidder has indicated "yes" in automatic payment field 416.

At step 220, after the winning bidder wins an auction item from the electronic auction web site, the winning bidder initiates a real-time payment, e.g., by clicking an icon on the electronic auction web site or by clicking a hyperlink provided on an e-mail transmitted by the electronic auction system 112 to the winning bidder and seller for accessing the payment segment. At step 222, the payment page, designated by reference numeral 500 in FIG. 5, is accessed, and the winning bidder then enters the amount of funds to be transferred to the seller in field 502. The amount of funds to be transferred to the seller could be, for example, the sum of the final auction price, the shipping and handing fees, and the taxes.

In the payment page 500, the winning bidder can also enter the amount of funds to be transferred to the system account database 120 in field 504, if the winning bidder elects to purchase insurance and/or have the operator of the system 110 personally guarantee the item won. It is noted that field 504 is already filled out by the system 110 if the winning bidder has pre-designated in field 418e for the system 110 to automatically provide insurance and/or personally guarantee the item won, and the final auction price is greater than or equal to the minimum final auction price provided in field 418e. The winning bidder can click on icon 506 for a list of insurance prices, similarly, to icon 419.

Figure 6:
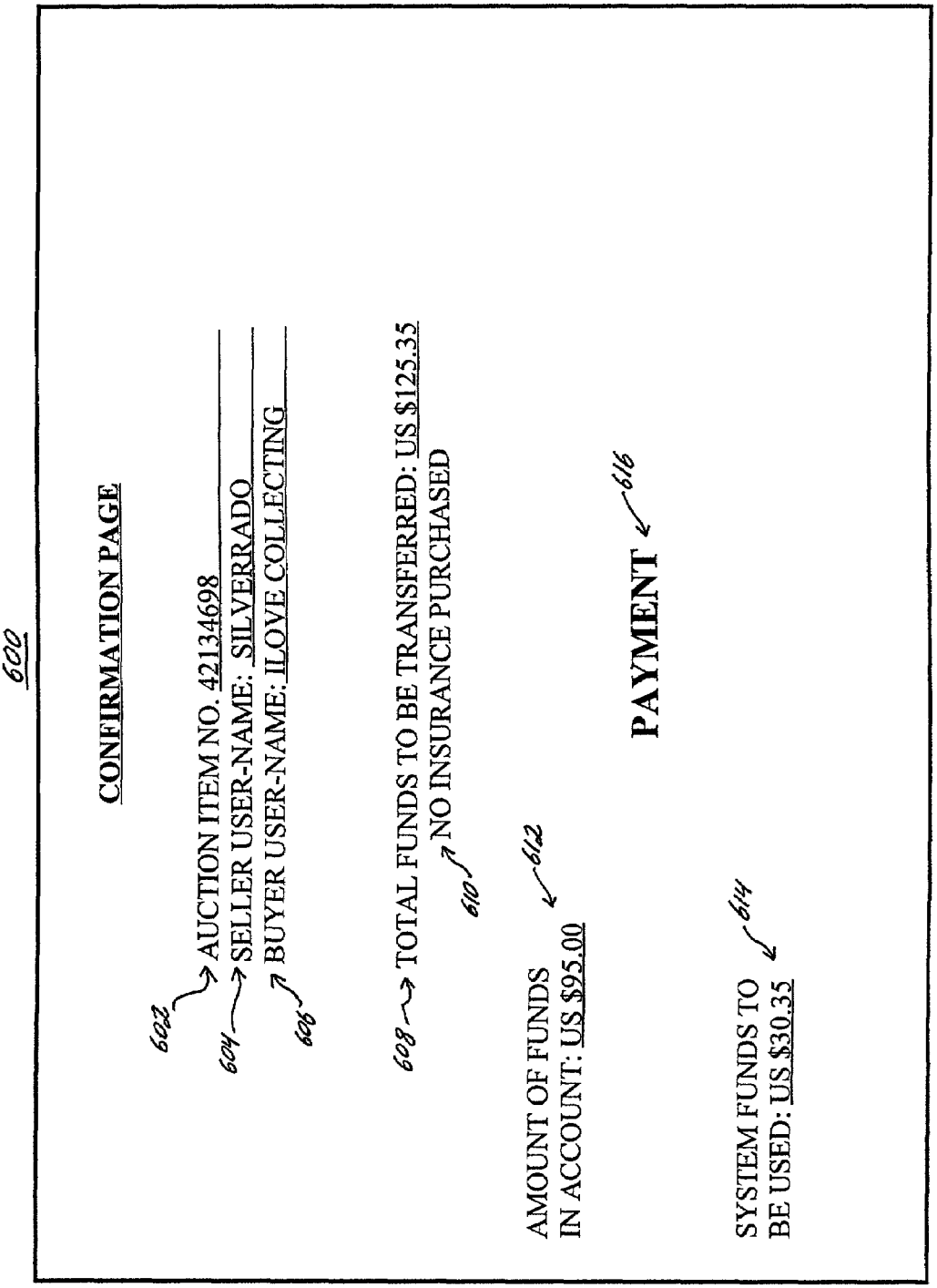
FIG. 6 illustrates a print of a confirmation page that the computerized electronic auction payment system provides to the winning bidder to confirm the entered payment information.

The payment page 500 also includes fields 508 providing various information. Fields 508 can provide, for example, the auction item number of the item won by the winning bidder, a description of the item, the seller's user-name, the buyer's user-name, and the final auction price. The winning bidder then enters his password in field 510, and then clicks the "NEXT" soft button 512. Upon clicking the "NEXT" soft button 512, the winning bidder accesses a confirmation page in step 224. The confirmation page is shown by FIG. 6 and designated generally by reference numeral 600.

The confirmation page 600 includes several fields: field 602 provides the auction item number; field 604 provides the seller's user-name; field 606 provides the buyer's user-name; field 608 provides the amount of funds to be transferred to the seller as entered in field 502 of the payment page 500; and field 610 indicates the amount of insurance purchased or if no insurance was purchased.

Field 612 indicates the amount of funds within the winning bidder's electronic auction payment account, and field 614 indicates the total amount of system funds to be used, if there are insufficient funds in the winning bidder's payment account and the winning bidder has indicated in field 418*d* for the system 110 to use system funds. Once the winning bidder has read the information provides by the confirmation page, he then authorizes payment at step 226 by clicking the "PAYMENT" soft button 616.

Upon clicking the "PAYMENT" soft button 612, the computerized electronic auction payment system debits the winning bidder's electronic auction payment account in by an amount equal to the amount entered in field 502 and credits the seller's electronic auction payment account and/or other accounts indicated by the seller in fields 402 and 404 in real-time, in accordance with the percentages entered in field 410. If insurance/personal guarantee has been specified by the winning bidder in field 504, the system 110 accordingly debits the winning bidder's electronic auction payment account in real-time, as described above, to purchase insurance and/or personal guarantee the auction item and to pay itself a service fee.

It is noted that if the winning bidder's electronic auction payment account does not have sufficient funds, the system 110 loans system funds from the system account to the winning bidder to effect payment, if the winning bidder has so indicated in field 418*d*. The amount of funds debited from the winning bidder's electronic auction payment account are replenished from sources indicated in field 408, if the winning bidder has so indicated in field 418*c*. Further, a pre-specified amount of funds are transferred to the winning bidder's electronic auction payment account, if the total amount of funds in the winning bidder's payment account are less than the pre-specified amount of funds as indicated in field 418*a*, following the transfer of funds to the seller's electronic auction payment account.

The computerized electronic auction payment system 110 withholds a predetermined percentage of the funds entered in field 502 upon the "PAYMENT" soft button 612 being clicked. These funds are withheld by the system 110 to pay the commission fees of the operator of the system 110 and/or the operator of the electronic auction system 112. The withheld funds are preferably stored within the system account maintained by the system account database 120.

It is contemplated that the payment transaction is stopped if the winning bidder does not have enough funds in his electronic auction payment account and has not indicated in field 418*d* for the computerized electronic auction payment system 110 to use system funds. If this is the case, the system 110 informs the winning bidder by a message upon the winning bidder clicking the "PAYMENT" soft button 612 of the fact that the winning bidder does not have enough funds to effect a real-time payment of the item won. The winning bidder can then transfer funds into his electronic auction payment account and then re-access the payment page 500; authorize the system 110 to use system funds by clicking field 418*d* and then re-access the payment page 500; or mail a check, money order, etc. to the seller.

Figure 7:
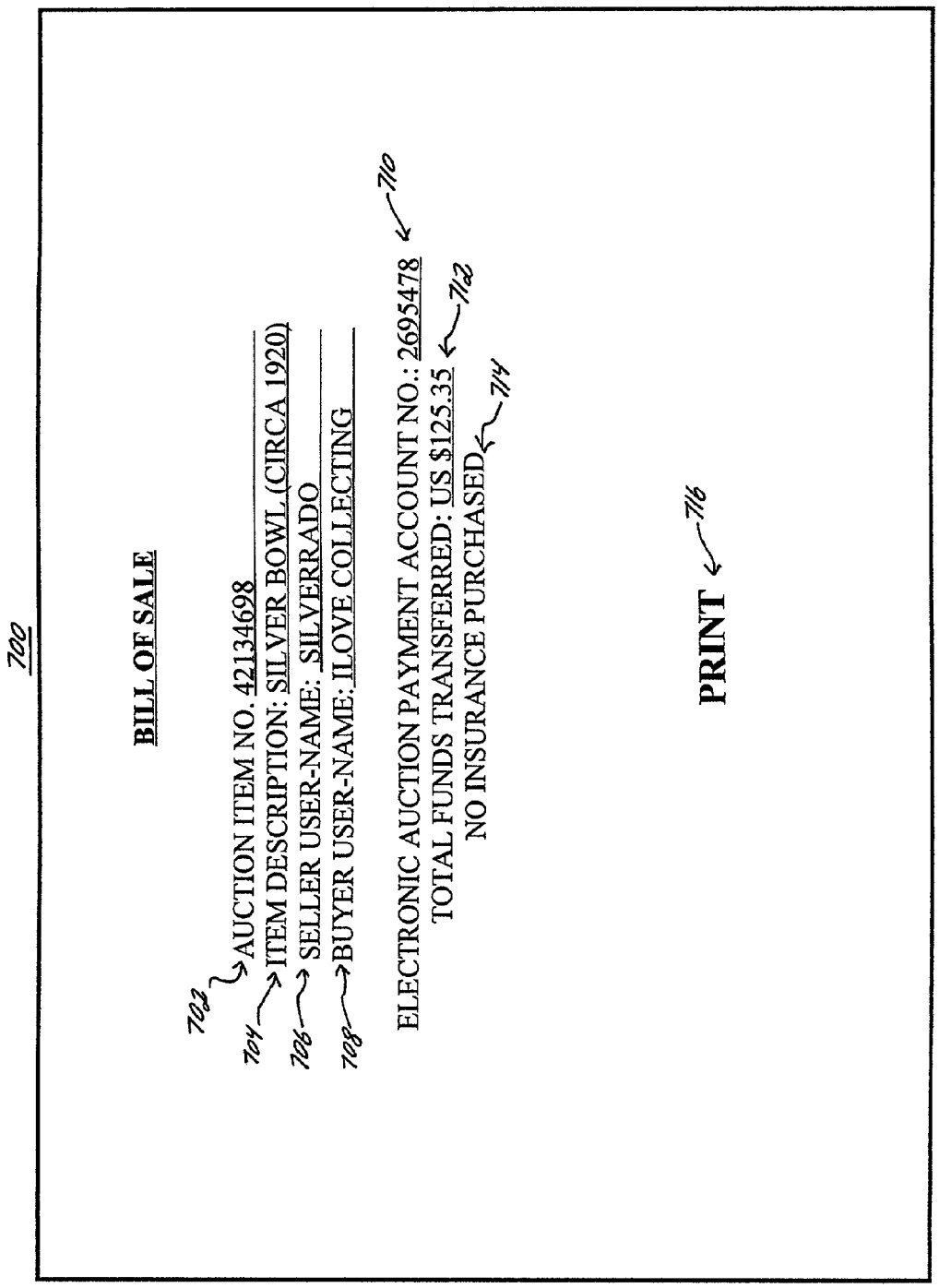
FIG. 7 illustrates a print of a bill of sale page that the computerized electronic auction payment system provides to the winning bidder upon authorizing payment to the seller.

At step 228, the computerized electronic auction payment system 110 displays a bill of sale or receipt, as shown by FIG. 7 and designated generally by reference numeral 700, indicating completion of the payment. The bill of sale 700 includes several fields: field 702 provides the auction item number; field 704 provides a description of the item won; field 706 provides the seller's user-name; field 708 provides the winning bidder's user-name; field 710 provides the electronic auction payment account number of the winning bidder's electronic auction payment account; field 712 provides the amount of funds transferred to the seller; and field 714 indicates if insurance was purchased by the winning bidder. The winning bidder can then click soft button 716 to print the bill of sale 700.

At step 230, an e-mail is transmitted to the winning bidder and the seller confirming the transaction. The e-mail also indicates the total amount of funds debited, withheld and transferred, the mailing address of the winning bidder, the auction item, and the final auction price. The mailing address of the winning bidder is preferably obtained from the database of electronic auction payment accounts 114. The auction item and the final auction price are obtained or transmitted from the electronic auction system 112. The e-mail can further include a hyperlink for linking to a web site where the winning bidder and seller can leave comments regarding their payment transaction. A hyperlink can also be included for viewing and/or printing the bill of sale or receipt as shown by FIG. 7.

For simplicity only a particular type of electronic auction has been described above in accordance with the system and method of the present invention. However, one skilled in the art can apply the inventive system and method to other types of electronic auctions, such as electronic Dutch auctions.

Although various preferred embodiments of the present invention have been described herein in detail, it will be appreciated by those skilled in the art, that variations may be made thereto without departing from the spirit of the invention or the scope of the appended claims.

We claim:

1. A method for effecting payment for a purchaser of at least one item offered for an electronic auction sale by a seller via an electronic auction web site maintained by at least one computing device of an electronic auction system, said method comprising the steps of:

maintaining an electronic database of a plurality of electronic auction payment accounts corresponding to a plurality of users, including the purchaser, of said electronic auction web site and a payment segment of said electronic auction web site by an electronic auction payment system integrated with said electronic auction system, each of said plurality of electronic auction payment accounts storing funds therein and each capable of being used for user transactions in the electronic auction system;

performing at least one payment-related activity by at least one processor of said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users, wherein at least one payment source corresponding to the purchaser is used to obtain funds for storing within the electronic auction payment account corresponding to the purchaser prior to debiting the electronic auction payment account corresponding to the purchaser; and crediting by said at least one processor at least one account corresponding to the seller to effect payment for the at least one item offered for the electronic auction sale via the electronic auction web site.

2. The method according to claim 1, wherein the plurality of electronic auction payment accounts includes an electronic auction payment account corresponding to the seller.

3. The method according to claim 2, wherein the at least one credited account corresponding to the seller includes at least the electronic auction payment account corresponding to the seller.

4. The method according to claim 1, further comprising the step of receiving authorization from the purchaser of the at least one item to perform the at least one payment-related activity and to credit the at least one account corresponding to the seller prior to the steps of debiting the purchaser's electronic auction payment account and crediting the at least one account corresponding to the seller.

5. The method according to claim 1, wherein the steps of debiting and crediting are performed in real-time.

6. The method according to claim 1, further comprising the steps of:
   determining if there are sufficient funds in the electronic auction payment account corresponding to the purchaser of the at least one item to effect payment; and
   performing the step of withdrawing funds from the at least one account storing funds therein and not corresponding to at least one of the plurality of users, if there are not sufficient funds in the electronic auction payment account corresponding to the purchaser of the at least one item.

7. The method according to claim 6, further comprising the step of charging interest for funds withdrawn from the at least one account storing funds therein to effect payment.

8. The method according to claim 1, further comprising the steps of:
   determining if the purchaser of the at least one item has indicated a purchase of insurance and/or for a personal guarantee for the at least one item; and
   debiting the electronic auction payment account corresponding to the purchaser of the at least one item for an amount of funds to cover the purchase of insurance and/or for the personal guarantee for the at least one item purchased, if the purchaser of the at least one item has indicated the purchase of insurance and/or for the personal guarantee for the at least one item.

9. The method according to claim 8, further comprising the step of retaining, by an operator of the at least one computing device, a portion of the amount of funds debited as a service fee for the purchase of insurance and/or for the personal guarantee for the at least one item.

10. The method according to claim 2, further comprising the step of initiating the investment of funds corresponding to at least one of the plurality of electronic auction payment accounts.

11. The method according to claim 10, further comprising the steps of:
   allocating a percentage of funds gained by investing the funds to the at least one of the plurality of electronic auction payment accounts; and
   retaining, by an operator of the at least one computing device, a percentage of funds gained by investing the funds.

12. The method according to claim 2, further comprising the step of issuing checks to at least one potential user having a corresponding electronic auction payment account.

13. The method according to claim I, further comprising the step of retaining, by an operator of the at least one computing device, a percentage of funds debited from the electronic auction payment account corresponding to the purchaser of the at least one item prior to crediting the at least one account corresponding to the seller.

14. A system for effecting payment for a purchaser of at least one item offered for an electronic auction sale by a seller via an electronic auction web site maintained by at least one computing device of an electronic auction system, said system comprising:
   an electronic auction payment system integrated with said electronic auction system, said electronic auction payment system comprising a plurality of electronic auction payment accounts and means for maintaining a payment segment of said electronic auction web site and said plurality of electronic auction payment accounts corresponding to a plurality of users, including the purchaser, of the electronic auction web site, where the plurality of electronic auction payment accounts store funds therein, and the plurality of electronic auction payment accounts include an electronic auction payment account corresponding to the purchaser of the at least one item offered for the electronic auction sale and an electronic auction payment account corresponding to the seller;
   means for performing at least one payment-related activity by said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users, wherein at least a portion of any debited funds correspond to funds transferred to the electronic auction payment account and stored therein prior to debiting the electronic auction payment account; and
   means for crediting at least one account corresponding to the seller to effect payment for the at least one item.

15. The system according to claim 14, further comprising:
   means for determining if there are sufficient funds in the electronic auction payment account corresponding to the purchaser of the at least one item to effect payment; and
   means for performing the step of withdrawing funds from the at least one account storing funds therein and not corresponding to at least one of the plurality of users, if there are not sufficient funds in the electronic auction payment account corresponding to the purchaser of the at least one item.

16. The system according to claim 15, further comprising means for charging interest for funds withdrawn from the at least one account storing funds therein to effect payment.

17. The system according to claim 14, further comprising means for initiating the investment of funds corresponding to at least one of the plurality of electronic auctionpayment accounts.

18. The system according to claim 17, further comprising:
   means for allocating a percentage of funds gained by investing the funds to the at least one of the plurality of electronic auction payment accounts; and
   means for retaining a percentage of funds gained by investing the funds.

19. The system according to claim 14, further comprising means for retaining a percentage of funds debited from he electronic auction payment account corresponding to the purchaser of the at least one item prior to crediting the at least one account corresponding to the seller.

20. The system according to claim 14, wherein the means for debiting and the means for crediting debit the electronic auction payment account corresponding to the purchaser of the at least one item and credit the at least one account corresponding to the seller, respectively, in real-time.

21. A payment system for effecting payment to a seller of at least one item offered for an electronic auction sale via an electronic auction web site and won by a winning bidder at the conclusion of the electronic auction sale, said electronic auction web site being maintained by an electronic auction system, said payment system comprising:
a database containing a plurality of electronic auction payment accounts, where the plurality of electronic auction payment accounts store actual funds therein, and where one of the plurality of electronic auction payment accounts corresponds to the winning bidder of the at least one item and one of the plurality of electronic auction payment accounts corresponds to the seller; and
a computing device including application software for maintaining the plurality of electronic auction payment accounts and for automatically effecting payment to the seller by accessing the database and debiting actual funds stored within the electronic auction payment account corresponding to the winning bidder of the at least one item and crediting at least one account corresponding to the seller without any intervention by the winning bidder following the conclusion of the electronic auction, wherein said payment system maintains the database containing the plurality of electronic auction payment accounts and a payment segment of the electronic auction web site, and wherein at least a portion of funds debited correspond to funds transferred to the electronic auction payment account and stored therein prior to debiting the electronic auction payment account.

22. The payment system according to claim 21, wherein the computing device debits the electronic auction payment account corresponding to the winning bidder of the at least one item and credits the at least one account corresponding to the seller in real-time.

23. The payment system according to claim 21, wherein the computing device further includes application software for automatically effecting payment to an operator of the electronic auction web site using at least funds debited from the electronic auction payment account corresponding to the winning bidder of the at least one item.

24. A method for automatically effecting payment for a user of an electronic auction web site maintained by an electronic auction system, said method comprising the steps of:
determining by at least one processor if there are sufficient funds in an electronic payment account to effect payment, said electronic payment account being maintained by an electronic auction payment system integrated with said electronic auction system, said electronic payment account corresponding to the user of the electronic auction web site and storing funds therein;
debiting the electronic payment account corresponding to the user of the electronic auction web site and crediting at least one account to effect payment for the user of the electronic auction web site, if there are sufficient funds in the electronic payment account corresponding to the user to effect payment, wherein at least a portion of any debited funds correspond to funds transferred to the electronic payment account and stored therein prior to debiting the electronic payment account; and
loaning funds to effect payment, if there are not sufficient funds in the electronic payment account corresponding to the user of the electronic auction web site.

25. The method according to claim 24, wherein the step of debiting the payment account corresponding to the user of the electronic auction web site and crediting the at least one account to effect payment for the user of the electronic auction web site, if there are sufficient funds in the payment account corresponding to the user to effect payment, occurs in real-time.

26. The method according to claim 24, further comprising the step of charging interest for loaning funds to effect payment.

27. The method according to claim 24, wherein the step of debiting comprises the step of retaining, by an operator associated with the electronic auction web site, a percentage of funds debited from the payment account corresponding to the user of the electronic auction web site prior to crediting the at least one account.

28. A payment system for effecting payment for at least one of a plurality of online auction registered users of an online auction web site maintained by an online auction system, said payment system comprising:
a database containing information corresponding to a plurality of accounts of the plurality of online auction registered users, said plurality of accounts storing funds therein; and
a computing device including application software for maintaining the plurality of accounts and for periodically effecting payment for the at least one of the plurality of online auction registered users by debiting an account of the plurality of accounts and crediting at least one account, wherein the debited account corresponds to the at least one online auction registered user, wherein said payment system is integrated with said online auction system and maintains a payment segment of said online auction web site, wherein at least a portion of funds debited correspond to funds transferred to the debited account and stored therein prior to debiting the account.

29. The payment system according to claim 28, wherein application software periodically effects payment for the at least one of the plurality of online auction registered users without any intervention by the at least one online auction registered user.

30. A payment system for effecting payment to an operator of an online auction web site maintained by an online auction system, said payment system comprising:
a database containing information corresponding to a plurality of accounts of a plurality of online auction registered users, said plurality of accounts storing funds therein; and
a computing device including application software for maintaining said plurality of accounts and for automatically effecting payment for at least one of the plurality of online auction registered users by debiting an account of the plurality of accounts and crediting at least one account corresponding to the operator, wherein the debited account corresponds to the at least one online auction registered user, wherein said payment system is integrated with said online auction system and maintains a payment segment of said online auction web site, wherein at least a portion of funds debited correspond to funds transferred to the debited account and stored therein prior to debiting the account.

31. The payment system according to claim 30, wherein application software automatically effects payment for the at least one of the plurality of online auction registered users without any intervention by the at least one online auction registered user.

32. The method according to claim 1, wherein the at least one payment source is a bank account.

33. The method according to claim 1, wherein the at least one payment source is a credit card.

34. The method according to claim 1, wherein said at least one payment source is used to automatically replenish at least a portion of the funds debited from the electronic auction payment account corresponding to the purchaser.

35. A method for effecting payment for a purchaser of at least one item offered for an electronic auction sale by a seller via an electronic auction web site maintained by at least one computing device of an electronic auction system, said method comprising the steps of:
  maintaining an electronic database of a plurality of electronic auction payment accounts corresponding to a plurality of users, including the purchaser, of said electronic auction web site and a payment segment of said electronic auction web site by an electronic auction payment system integrated with said electronic auction system, each of said plurality of electronic auction payment accounts storing funds therein and each capable of being used for user transactions in the electronic auction system;
  performing at least one payment-related activity by at least one processor of said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users, wherein at least a portion of any debited funds correspond to funds transferred to the electronic auction payment account and stored therein prior to debiting the electronic auction payment account; and
  crediting by said at least one processor at least one account corresponding to the seller to effect payment for the at least one item offered for the electronic auction sale via the electronic auction web site.

36. The method according to claim 35, wherein at least a portion of the debited funds are transferred to the electronic auction payment account prior to debiting the electronic auction payment account from at least one of the plurality of electronic auction payment accounts.

37. The method according to claim 35, wherein at least a portion of the debited funds are transferred to the electronic auction payment account prior to debiting the electronic auction payment account from at least one payment source corresponding to the purchaser.

38. A method for effecting payment for a purchaser of at least one item offered for an electronic auction sale by a seller via an electronic auction web site maintained by at least one computing device of an electronic auction system, said method comprising the steps of:
  maintaining an electronic database of a plurality of electronic auction payment accounts corresponding to a plurality of users, including the purchaser, of said electronic auction web site and a payment segment of said electronic auction web site by an electronic auction payment system integrated with said electronic auction system, each of said plurality of electronic auction payment accounts storing actual funds therein and said actual funds capable of being used for user transactions in the electronic auction system;
  performing by at least one processor at least one payment-related activity by said electronic auction payment system for effecting payment for said purchaser, said at least one payment-related activity selected from the group consisting of debiting an electronic auction payment account corresponding to he purchaser of the at least one item and maintained by said electronic auction payment system, and withdrawing funds from at least one account storing funds therein and not corresponding to at least one of the plurality of users; and
  crediting by said at least one processor at least one account corresponding to the seller to effect payment for the at least one item offered for the electronic auction sale via the electronic auction web site.

39. A system for effecting payment for a purchaser of at least one item offered for an electronic auction sale by a seller via an electronic auction web site maintained by at least one computing device of an electronic auction system, said system comprising:
  an electronic auction payment system integrated with said electronic auction system, said electronic auction payment system comprising a plurality of electronic auction payment accounts and means for maintaining a payment segment of said electronic auction web site and said plurality of electronic auction payment accounts corresponding to a plurality of users, including the purchaser, of the electronic auction web site, where each of the plurality of electronic auction payment accounts store actual funds therein, and the plurality of electronic auction payment accounts include an electronic auction payment account corresponding to the purchaser of the at least one item offered for the electronic auction sale and an electronic auction payment account corresponding to the seller;
  means for performing at least one payment-related activity by said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing actual funds therein and not corresponding to at least one of the plurality of users; and
  means for crediting at least one account corresponding to the seller to effect payment for the at least one item.

40. A payment system for effecting payment to a seller of at least one item offered for an electronic auction sale via an electronic auction web site and won by a winning bidder at the conclusion of (he electronic auction sale, said electronic auction web site being maintained by an electronic auction system, said payment system comprising:
  a database containing a plurality of electronic auction payment accounts, where each of the plurality of electronic auction payment accounts store actual funds therein, and where one of the plurality of electronic auction payment accounts corresponds to the winning bidder of the at least one item and one of the plurality of electronic auction payment accounts corresponds to the seller; and
  a computing device including application software for maintaining the plurality of electronic auction payment accounts and for automatically effecting payment to the seller by accessing the database and debiting actual funds stored within the electronic auction payment account corresponding to the winning bidder of the at least one item and crediting at least one account corresponding to the seller without any intervention by the winning bidder following the conclusion of the electronic auction, wherein said payment system maintains the database containing the plurality of electronic auction payment accounts and a payment segment of the electronic auction web site.

41. A payment system for effecting payment for at least one of a plurality of online auction registered users of an online auction web site maintained by an online auction system, said payment system comprising:
- a database containing information corresponding to a plurality of accounts of the plurality of online auction registered users, each of said plurality of accounts storing actual funds therein; and
- a computing device including application software for maintaining the plurality of accounts and for periodically effecting payment for the at least one of the plurality of online auction registered users by debiting actual funds stored within an account of the plurality of accounts and crediting at least one account, wherein the debited account corresponds to the at least one online auction registered user, wherein said payment system is integrated with said online auction system and maintains a payment segment of said online auction web site.

42. The payment system according to claim 41, wherein application software periodically effects payment for the at least one of the plurality of online auction registered users without any intervention by the at least one online auction registered user.

43. A payment system for effecting payment to an operator of an online auction web site maintained by an online auction system, said payment system comprising:
- a database containing information corresponding to a plurality of accounts of a plurality of online auction registered users, each of said plurality of accounts storing actual funds therein; and
- a computing device including application software for maintaining said plurality of accounts and for automatically effecting payment for at least one of the plurality of online auction registered users by debiting actual funds stored within an account of the plurality of accounts and crediting at least one account corresponding to the operator, wherein the debited account corresponds to the at least one online auction registered user, wherein said payment system is integrated with said online auction system and maintains a payment segment of said online auction web site.

44. The payment system according to claim 43, wherein application software automatically effects payment for the at least one of the plurality of online auction registered users without any intervention by the at least one online auction registered user.

45. A method for effecting payment for a purchaser of at least one item offered for an electronic auction sale by a seller via an electronic auction web site maintained by at least one computing device of an electronic auction system, said method comprising the steps of:
- maintaining an electronic database of a plurality of electronic auction payment accounts corresponding to a plurality of users, including the purchaser, of said electronic auction web site and a payment segment of said electronic auction web site by an electronic auction payment system integrated with said electronic auction system, each of said plurality of electronic auction payment accounts storing funds therein and not information relating to sources which can be used to initiate payment, such as credit card information, and each of said plurality of electronic auction payment accounts capable of being used for user transactions in the electronic auction system;
- performing by at least one processor at least one payment-related activity by said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users; and
- crediting by said at least one processor at least one account corresponding to the seller to effect payment for the at least one item offered for the electronic auction sale via the electronic auction web site.

46. The method according to claim 45, wherein the at least one payment source is a bank account.

47. The method according to claim 45, wherein the at least one payment source is a credit card.

48. The method according to claim 45, wherein said at least one payment source is used to automatically replenish at least a portion of the funds debited from the electronic auction payment account corresponding to the purchaser.

49. The method according to claim 45, wherein at least a portion of the debited funds are transferred to the electronic auction payment account prior to debiting the electronic auction payment account from at least one of the plurality of electronic auction payment accounts.

50. The method according to claim 45, wherein at least a portion of the debited funds are transferred to the electronic auction payment account prior to debiting the electronic auction payment account from at least one payment source corresponding to the purchaser.

51. A method for effecting payment for a purchaser of at least one item offered for an electronic auction sale by a seller via an electronic auction web site maintained by at least one computing device of an electronic auction system, said method comprising the steps of:
- maintaining an electronic database of a plurality of electronic auction payment accounts corresponding to a plurality of users, including the purchaser, of said electronic auction web site and a payment segment of said electronic auction web site by an electronic auction payment system integrated with said electronic auction system, each of said plurality of electronic auction payment accounts storing funds therein and not information relating to sources which can be used to initiate payment, such as credit card information, and each of said plurality of electronic auction payment accounts capable of being used for user transactions in the electronic auction system;
- performing by at least one processor at least one payment-related activity by said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users; and
- crediting by said at least one processor at least one account corresponding to the seller to effect payment for the at least one item offered for the electronic auction sale via the electronic auction web site.

52. A system for effecting payment for a purchaser of at least one item offered for an electronic auction sale by a seller via an electronic auction web site maintained by at least one computing device of an electronic auction system, said system comprising:

an electronic auction payment system integrated with said electronic auction system, said electronic auction payment system comprising a plurality of electronic auction payment accounts and means for maintaining a payment segment of said electronic auction web site and said plurality of electronic auction payment accounts corresponding to a plurality of users, including the purchaser, of the electronic auction web site, where each of the plurality of electronic auction payment accounts store funds therein and not information relating to sources which can be used to initiate payment, such as credit card information, and the plurality of electronic auction payment accounts include an electronic auction payment account corresponding to the purchaser of the at least one item offered for the electronic auction sale and an electronic auction payment account corresponding to the seller;

means for performing at least one payment-related activity by said electronic auction payment system for effecting payment for said purchaser, said at least one payment-related activity selected from the group consisting of debiting an electronic auction payment account corresponding to the purchaser of the at least one item and maintained by said electronic auction payment system, and withdrawing funds from at least one account storing funds therein and not corresponding to at least one of the plurality of users; and means for crediting at least one account corresponding to the seller to effect payment for the at least one item.

53. A payment system for effecting payment to a seller of at least one item offered for an electronic auction sale via an electronic auction web site and won by a winning bidder at the conclusion of the electronic auction sale, said electronic auction web site being maintained by an electronic auction system, said payment system comprising:

a database containing a plurality of electronic auction payment accounts, where each of the plurality of electronic auction payment accounts store funds therein and not information relating to sources which can be used to initiate payment, such as credit card information, and where one of the plurality of electronic auction payment accounts corresponds to the winning bidder of the at least one item and one of the plurality of electronic auction payment accounts corresponds to the seller; and a computing device including application software for maintaining the plurality of electronic auction payment accounts and for automatically effecting payment to the seller by accessing the database and debiting funds stored within the electronic auction payment account corresponding to the winning bidder of the at least one item and crediting at least one account corresponding to the seller without any intervention by the winning bidder following the conclusion of the electronic auction, wherein said payment system maintains the database containing the plurality of electronic auction payment accounts and a payment segment of the electronic auction web site.

54. A payment system for effecting payment for at least one of a plurality of online auction registered users of an online auction web site maintained by an online auction system, said payment system comprising:

a database containing information corresponding to a plurality of accounts of the plurality of online auction registered users, each of said plurality of accounts storing funds therein and not information relating to sources which can be used to initiate payment, such as credit card information; and a computing device including application software for maintaining the plurality of accounts and for periodically effecting payment for the at least one of the plurality of online auction registered users by debiting funds stored within an account of the plurality of accounts and crediting at least one account, wherein the debited account corresponds to the at least one online auction registered user, wherein said payment system is integrated with said online auction system and maintains a payment segment of said online auction web site.

55. The payment system according to claim 54, wherein application software periodically effects payment for the at least one of the plurality of online auction registered users without any intervention by the at least one online auction registered user.

56. A payment system for effecting payment to an operator of an online auction web site maintained by an online auction system, said payment system comprising:

a database containing information corresponding to a plurality of accounts of a plurality of online auction registered users, each of said plurality of accounts storing funds therein and not information relating to sources which can be used to initiate payment, such as credit card information; and a computing device including application software for maintaining said plurality of accounts and for automatically effecting payment for at least one of the plurality of online auction registered users by debiting funds stored within an account of the plurality of accounts and crediting at least one account corresponding to the operator, wherein the debited account corresponds to the at least one online auction registered user, wherein said payment system is integrated with said online auction system and maintains a payment segment of said online auction web site.

57. The payment system according to claim 56, wherein application software automatically effects payment for the at least one of the plurality of online auction registered users without any intervention by the at least one online auction registered user.

* * * * *

UNITED STATES PATENT AND TRADEMARK OFFICE
CERTIFICATE OF CORRECTION

PATENT NO. : 7,483,856 B2
APPLICATION NO. : 09/764618
DATED : January 27, 2009
INVENTOR(S) : George Likourezos and Michael A. Scaturro It is certified that error appears in the above-identified patent and that said Letters Patent is hereby corrected as shown below:

Column 17, line 60 claim 13, "The method according to claim I," should be --The method according to claim 1,--

Column 18, line 49 claim 17, "the plurality of electronic auctionpayment" should be --the plurality of electronic auction payment--

Column 18, line 59 claim 19, "of funds debited from he", should be --of funds debited from the--

Column 22, line 1 claim 38, "corresponding to he purchaser", should be --corresponding to the purchaser--

Column 22, line 45 claim 40, "conclusion of(he electronic", should be --conclusion of the electronic--

Signed and Sealed this

Thirty-first Day of March, 2009

JOHN DOLL
*Acting Director of the United States Patent and Trademark Office*